Sept. 8, 1959  C. F. BARANAUCKAS ET AL  2,903,463
PROCESS FOR THE MANUFACTURE AND RECOVERY OF A
CHLORINE-CONTAINING CARBOXYLIC ANHYDRIDE
Filed July 3, 1956
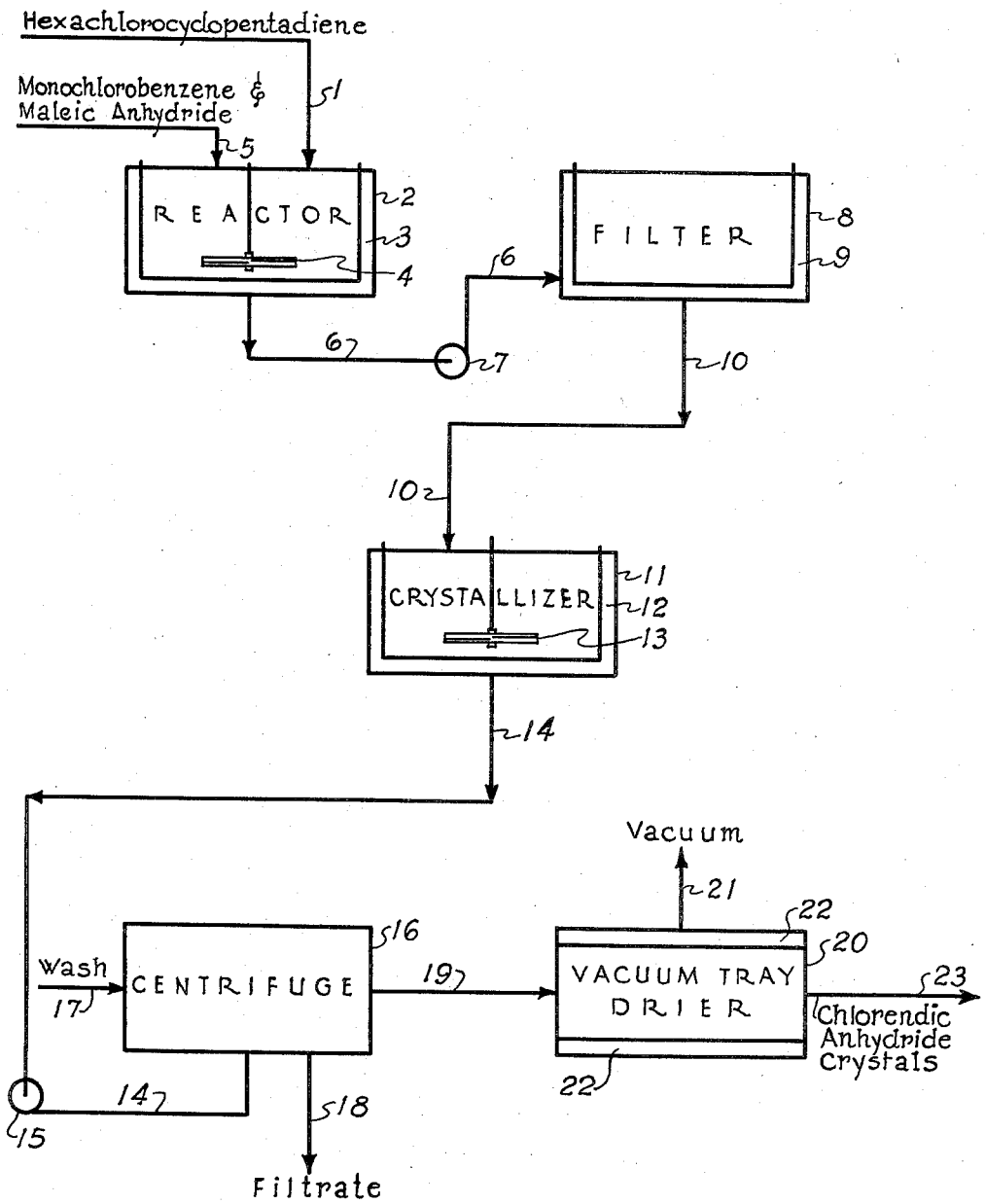

United States Patent Office 2,903,463
Patented Sept. 8, 1959

2,903,463

PROCESS FOR THE MANUFACTURE AND RECOVERY OF A CHLORINE-CONTAINING CARBOXYLIC ANHYDRIDE

Charles F. Baranauckas and Alexander L. Blackwell, Niagara Falls, and James L. Olmstead, North Tonawanda, N.Y., assignors to Hooker Chemical Corporation, Niagara Falls, N.Y., a corporation of New York Application July 3, 1956, Serial No. 595,649

5 Claims. (Cl. 260—346.6)

This invention relates to the manufacture of chlorendic anhydride, and is more particularly concerned with making chlorendic anhydride having desirable purity and color characteristics. Chlorendic anhydride, also known as hexachloroendomethylene tetrahydrophthalic anhydride is 1,4,5,6,7,7-hexachlorobicyclo-(2.2.1)-5-heptene-2,3-dicarboxylic anhydride, and in this specification will be referred to as "chlorendic anhydride" for brevity.

According to the prior art, chlorendic anhydride is formed by the reaction of hexachlorocyclopentadiene and maleic anhydride in refluxing xylene solution and is described in United States Letters Patent 2,606,910 issued to Herzfeld et al. Chlorendic acid, the product formed by the hydrolysis of the anhydride, is a dibasic acid containing a large amount of stable chlorine and has found use on a commercial scale for preparing fire-resistant polyester resins.

In Prill, JACS 69, 62 (1947), hexachlorocyclopentadiene and maleic anhydride were reacted in toluene to form the adduct. Unreacted hexachlorocyclopentadiene and toluene were removed by steam distillation. The dicarboxylic acid resulting from hydrolysis of the adduct was mostly in the form of a heavy oil layer in the distillation residue (about 1500 milliters of water), and crystallized on cooling to room temperature. It is stated that the product was purified by recrystallization from water or toluene. No data on yield or purity of the product are given.

Chlorendic anhydride prepared by the methods described in the prior art requires multi-recrystallization to produce a product having desirable color characteristics. In addition, when operating according to the procedure of Prill, steam distillation of the reaction mixture is time consuming as hexachlorocyclopentadiene steam distills slowly, and tends to develop color in the mother liquor and the colored impurities are soluble in water and chlorendic acid. Further the use of two solvents, namely toluene for the condensation reaction and water for the crystallization step requires a complicated recovery system for the solvents.

It is among the principal objects of this invention to provide a method for the production and recovery of chlorendic anhydride which is direct and simple and which is readily adaptable to large scale commercial operations. A further object is to provide a method for the production and recovery of chlorendic anhydride where the product obtained is suitable for the manufacture of high-grade resins, e.g., light-colored polyester resins and especially for hardening epoxy resins. Other objects will become apparent to those skilled in the art on consideration of the complete specification and claims.

We have now found a new and useful method for making chlorendic anhydride of a light color and high purity by a simple and direct process involving the use of a single organic solvent for both the condensation reaction and the crystallization step.

More particularly, the process of this invention involves reacting hexachlorocyclopentadiene and maleic anhydride at an elevated temperature between about 110 and 170 degrees centigrade in a chlorinated benzene as solvent, for approximately eight to ten hours. The condensation reaction product is filtered at an elevated temperature between about 120 to 130 degrees centigrade. The liquid filtrate is then cooled to about 70 degrees centigrade whereupon chlorendic anhydride crystals begin to precipitate. The crystallization medium of a chlorinated benzene is further cooled to about 25 to 30 degrees centigrade. The resultant slurry is washed with the solvent and then dried under vacuum at an elevated temperature. The crystalline product so produced is recovered from the drier.

The color of the chlorendic anhydride product was determined by the following procedure: 30 grams of anhydride were dissolved in 17 milliliters of 50:50 acetone and methanol and the color of the solution was determined in an instrument, such as the Taylor water analyzer, by comparison of the anhydride solution with Hazen (American Public Health Assn.) standards reading from 0 to 70. For colors darker than 70 the solution was diluted and the reading was multiplied by the appropriate factor.

In order that this invention may be more easily understood it will be described with reference to the attached drawing which illustrates a diagrammatic flow sheet of one embodiment embraced within the scope of this invention.

Referring to the figure: Hexachlorocyclopentadiene 1 is fed into a reactor 2 having a heating and/or cooling means 3 and agitation means 4. The temperature of reactor contents is raised to about 140 degrees centigrade. Then, a molten mixture of maleic anhydride and monochlorobenzene 5 is charged into the reactor over an extended period while maintaining the reaction temperature at about 145 degrees centigrade. An atmosphere of inert gas such as nitrogen or carbon dioxide is maintained in the process equipment to insure moisture free conditions. The reaction mixture is maintained at the above temperature for approximately eight to ten hours, then additional solvent may be added and the reaction mixture is transferred 6 while hot, by means of a pump 7, to a filter 8 having a heating means 9. The filtered liquid is transferred 10 to a crystallizer 11 having heating and/or cooling means 12 and agitation means 13. The resultant slurry of crystals is transferred 14 by means of a pump 15 to a centrifuge 16 and washed 17 with solvent. The filtrate 18 is removed and the chlorendic anhydride present is recovered as chlorendic acid. The chlorendic anhydride crystals are transferred 19 to a tray drier 20 maintained under vacuum 21 and heated with steam 22. The dry chlorendic anhydride crystals 23 are transferred to storage.

The following example illustrates our invention but it is to be understood that the specific details given in the examples have been chosen for the purpose of illustration and are not intended to limit our invention, except as defined in the appended claims.

Example 1

Nineteen hundred (1900) pounds (6.95 lb. moles) of hexachlorocyclopentadiene was charged into a 500 gallon glass-lined reactor, and means for agitation and heating and/or cooling. Then the temperature of the hexachlorocyclopentadiene was raised to 145 degrees centigrade. A molten mixture of 685 pounds (6.99 lb. moles) of maleic anhydride (99.6%) and 330 pounds of monochlorobenzene was heated to 65 degrees centigrade and gradually charged into the reactor over a period of about two hours. During this addition period the temperature of the reaction mixture was maintained at 145±5 degrees centigrade. An atmosphere of carbon dioxide was maintained over the reaction mixture during the reaction period and in subsequent steps to insure moisture free conditions. On completion of the addition, the feed lines were flushed with 10 gallons (92 pounds) of monochlorobenzene. Then the temperature of the reaction mixture was maintained at 145±5 degrees centigrade for an additional 10 hours to insure completion of the reaction. At the end of the holding period the condensation batch was diluted with 150 gallons (1,380 pounds) of monochlorobenzene and 5 pounds of filter aid was added. Then, the condensation batch was removed from the reactor and filtered at a temperature of about 125 to 135 degrees centigrade into a 500 gallon glass-lined crystallizer. The transfer line was flushed with 70 gallons (645 pounds) of monochlorobenzene. Then, the crystallizer contents were cooled to about 80 degrees centigrade whereupon chlorendic anhydride crystals began to precipitate from the crystallization medium, namely monochlorobenzene and was finally cooled to about 25 to 30 degrees centigrade. The resultant slurry was then transferred to a 500 gallon glass-lined centrifuge feed tank prior to passing the slurry into a centrifuge. The centrifuge cake was washed with monochlorobenzene (about 940 pounds total) and the filtrate which contained chlorendic anhydride was removed and recovered as chlorendic acid. The washed chlorendic anhydride cake was transfered to a vacuum tray drier which had 25 to 30 millimeters of mercury absolute pressure with 60 p.s.i.g. steam pressure on the heating plates (approximately 150° C.) for 5 hours. Chlorendic anhydride crystals (1665 pounds) were removed from the drier and analyzed as follows: yield—64.5 percent; purity 99.57 percent; color 40 (Hazen).

Example 1 illustrates a preferred embodiment of the process of this invention and demonstrates several important factors as follows: (1) the use of a common organic solvent, namely monochlorobenzene, for both the condensation reaction and the crystallization step eliminates the use of two solvents in the process and the ensuing more complicated recovery system required for a two solvent process; (2) a single crystallization step provides a product having high purity and good color.

*Example 2*

In laboratory scale apparatus and under conditions similar to that described in connection with Example 1, a solution of 900 grams (3.3 moles) of hexachlorocyclopentadiene, 335 grams (3.4 moles) of maleic anhydride in 300 milliliters of 95 percent ortho-dichlorobenzene and 5 percent paradichlorobenzene was heated to 135 degrees centigrade and the temperature of the reaction mixture was maintained between 135 degrees and 150 degrees centigrade for approximately 10 hours. At the end of the holding period the condensation batch was diluted with 1200 milliliters of orthodichlorobenzene and then processed in a manner after Example 1. The chlorendic anhydride crystals were dried and analyzed as follows: yield—53.8 percent; purity—99.1 percent; color 40 (Hazen).

While alkyl benzenes such as toluene cannot be used at temperatures above about 100 degrees centigrade with maleic anhydride because of the development of color (greater than 200 Hazen) it has been found that temperatures up to about 170 degrees centigrade may be employed when using a chlorinated benzene, although a temperature below about 150 degrees centigrade is preferred.

A small excess of maleic anhydride over hexachlorocyclopentadiene is desirable to insure the complete reaction of hexachlorocyclopentadiene which has a very strong unpleasant odor, and unless it is removed it will impart undesirable characteristics to the product. Hexachlorocyclopentadiene may be added to the molten mixture of maleic anhydride and solvent or in the reverse order, that is adding the molten mixture to hexachlorocyclopentadiene.

The solvents which may be used in the condensation and crystallization steps of this invention are the liquid chlorinated benzenes, such as monochlorobenzene, orthodichlorobenzene and meta-dichlorobenzene and mixtures thereof. In the manufacture of liquid chlorinated benzenes such as ortho-dichlorobenzene there is obtained other isomers such as para-dichlorobenzene and it is to be understood that such liquid solvents may be employed in the process of this invention. The amount of solvent employed is not critical but should be minimized for the sake of economy both in recovery of solvent and recovery of product soluble in the solvent. If the resultant slurry is difficult to handle in transfer operations more solvent may be added provided an economical balance is maintained. The preferred ratio, as shown in Example 1, is about 0.6 pound of solvent per pound of product although larger quantities may be used without causing a detrimental effect to the process.

Although a temperature range of 110 to 170 degrees centigrade is permissible, it is preferred to react the hexachlorocyclopentadiene and maleic anhydride to a temperature of about 135 degrees to 150 degrees centigrade. It is preferred to heat the reaction mixture above 110 degrees centigrade in order that the reaction may proceed at an economical rate. At a temperature above about 170 degrees centigrade the color of the resultant product is unsatisfactory for high-grade polyester resins and the reverse Diels-Alder reaction occurs with concomitant color formation. It has been found necessary to employ a solvent to maintain control of the reaction of hexachlorocyclopentadiene and maleic anhydride as the product chlorendic anhydride (M.P. 239 to 240° C.) crystalizes from the reactants usually in a two phase (solid-liquid) reaction mixture that makes it extremely difficult to effect complete reaction without the attendant development of color.

It is to be understood that the above-described arrangements are simply illustrative of the application of the principles of this invention. Numerous other arrangements may be readily devised by those skilled in the art which will embody the principles of this invention and fall within the spirit and scope thereof.

We claim:

1. In a process for making and recovering chlorendic anhydride, the steps which include: reacting hexachlorocyclopentadiene and maleic anhydride in the presence of a liquid chlorinated benzene as solvent, at an elevated temperature; crystallizing said chlorendic anhydride so formed from said solvent, recovering the crystalline product so formed.

2. In a process for making and recovering chlorendic anhydride, the steps which include: reacting hexachlorocyclopentadiene and maleic anhydride in the presence of a liquid chlorinated benzene as solvent, at a temperature between 110 degrees and 170 degrees centigrade; crystallizing said chlorendic anhydride so formed from said solvent, recovering the crystalline product so formed.

3. In a process for making and recovering chlorendic anhydride, the steps which include: reacting hexachlorocyclopentadiene and maleic anhydride in the presence of a liquid chlorinated benzene as solvent, at a temperature between 110 degrees and 170 degrees centigrade; crystallizing said chlorendic anhydride so formed from said solvent, centrifuging the resultant slurry; washing the resultant crystals with said solvent; drying said crystals at an elevated temperature; recovering the crystalline product so produced.

4. In a process for making and recovering chlorendic anhydride, the steps which include: reacting hexachlorocyclopentadiene and maleic anhydride in the presence of a liquid chlorinated benzene as solvent, at a temperature between 110 degrees and 170 degrees centigrade; filtering the reaction mixture at an elevated temperature; crystallizing said chlorendic anhydride so formed from said solvent, centrifuging the resultant slurry; washing the resultant crystals; drying said crystals at an elevated temperature, recovering the crystalline product so produced.

5. In a process for making and recovering chlorendic anhydride, the steps which include: reacting hexachlorocyclopentadiene and maleic anhydride in the presence of monochlorobenzene as solvent, at a temperature between 110 degrees and 170 degrees centigrade; filtering the reaction mixture at a temperature between about 120 degrees and 130 degrees centigrade; cooling the resultant filtrate and crystallizing the chlorendic anhydride so formed from monochlorobenzene, centrifuging the resultant slurry; washing the resultant crystals with monochlorobenzene, drying said crystals under vacuum at an elevated temperature; recovering the crystalline product so formed.

References Cited in the file of this patent

UNITED STATES PATENTS

| | | |
|---|---|---|
| 2,606,910 | Herzfeld | Aug. 12, 1952 |
| 2,635,979 | Lidov | Apr. 21, 1953 |
| 2,697,103 | Ordas | Dec. 12, 1954 |
| 2,752,361 | Robitschek | June 26, 1956 |
| 2,779,769 | Robitschek | Jan. 29, 1957 |